US010911543B2

(12) United States Patent
Biswas et al.

(10) Patent No.: US 10,911,543 B2
(45) Date of Patent: Feb. 2, 2021

(54) RESOURCES MANAGEMENT IN INTERNET OF ROBOTIC THINGS (IORT) ENVIRONMENTS

(71) Applicant: Tata Consultancy Services Limited, Mumbai (IN)

(72) Inventors: Swagata Biswas, Kolkata (IN); Swarnava Dey, Kolkata (IN); Arijit Mukherjee, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/353,108

(22) Filed: Mar. 14, 2019

(65) Prior Publication Data

US 2020/0007624 A1    Jan. 2, 2020

(30) Foreign Application Priority Data

Jun. 28, 2018  (IN) .............................. 201821024064

(51) Int. Cl.
*G06F 15/16* (2006.01)
*H04L 29/08* (2006.01)
*H04L 12/911* (2013.01)

(52) U.S. Cl.
CPC .............. *H04L 67/12* (2013.01); *H04L 47/70* (2013.01)

(58) Field of Classification Search
CPC ....................................................... H04L 67/12
See application file for complete search history.

(56) References Cited

U.S. PATENT DOCUMENTS

| 2003/0172106 A1* | 9/2003 | Highleyman ....... G06F 11/1492 718/106 |
| 2017/0054592 A1* | 2/2017 | Olrog .................... G06F 11/203 |
| 2019/0205180 A1* | 7/2019 | Macha ................ G06F 11/3055 |

FOREIGN PATENT DOCUMENTS

| CN | 101256404 | 9/2008 |
| CN | 105988451 | 10/2016 |

OTHER PUBLICATIONS

Latifi, Z. et al. (2014). "A TMR Genetic Voting Algorithm for Fault-tolerant Medical Robot," *Procedia Computer Science*, vol. 42; pp. 301-307.

(Continued)

*Primary Examiner* — Kevin T Bates
*Assistant Examiner* — Clarence D McCray
(74) *Attorney, Agent, or Firm* — Finnegan, Henderson, Farabow, Garrett & Dunner, LLP

(57) ABSTRACT

Cloud robotics infrastructures generally support heterogeneous services that are offered by heterogeneous resources whose reliability or availability also varies widely with varying lifetime. For such systems, defining a static redundancy configuration for all services is difficult and often biased. Also, it is not feasible to define a redundancy configuration separately for each unique service. Therefore, in the present disclosure a trade-off between the two is ensured by providing At-most M-Modular Flexible Redundancy Model wherein an exact degree of redundancy is defined and is given to each service in a heterogeneous service environment and monitoring each task and subtask status to ensure that each subtask gets accomplished thereby enabling the tuning of the tradeoff between redundancy and cost and determining efficiency of the system by estimating number of resources utilized to complete specific subtask (Continued)

and comparing the resources utilization with the exact degree of redundancy defined.

9 Claims, 7 Drawing Sheets

(56) References Cited

OTHER PUBLICATIONS

Anjankar, S.C. et al. (May 2014). "Fault Tolerant and Correction System Using Triple Modular Redundancy," *International Journal of Emerging Engineering Research and Technology*, vol. 2, issue 2; pp. 187-191.

* cited by examiner

RESOURCES MANAGEMENT IN INTERNET OF ROBOTIC THINGS (IORT) ENVIRONMENTS

PRIORITY CLAIM

This U.S. patent application claims priority under 35 U.S.C. § 119 to: India Application No. 201821024064, filed on Jun. 28, 2018. The entire contents of the aforementioned application are incorporated herein by reference.

TECHNICAL FIELD

The disclosure herein generally relates to resource management, and, more particularly, to resources management in Internet of Robotic Things (IoRT) environments.

BACKGROUND

The current emphasis on performing complex, collaborative tasks using multiple robots has led to the emergence of fields like Internet of Robotic Things (IoRT) and Cloud Robotics (CR). Artificial Intelligence tasks such as image classification, segmentation, object localization and detection, action recognition, 3D point cloud formation and manipulation, time-series prediction etc. require significant system resources, typically unavailable in inexpensive robots with limited onboard processing, memory and storage capacity. Cloud robotics, using power of private/public cloud servers for offloading complex computations, have gained significant research interest in past few decades. Use of inexpensive robots along with cloud/edge powered distributed intelligence have allowed robots to be integrated into applications, for example, healthcare, production and distribution warehouse, elderly care, etc. A major concern in such networked and distributed task execution setup is the failure of robot (sensors and actuators), Cloud/Edge server and wireless network failures which directly impact the job completion and timeliness related targets. With only solution to reliability being redundancy in terms of resources, the traditional redundancy assignment schemes are not cost effective for tightly budgeted IoRT/CR deployments, where robots are primarily used for achieving high task throughput at reduced cost. Assuming that static assignment of redundant resources might result in wastage, it is thus essential to effectively schedule the limited available redundant resources and provide a suitable framework to system designer to tune trade-off between redundancy and cost.

SUMMARY

Embodiments of the present disclosure present technological improvements as solutions to one or more of the above-mentioned technical problems recognized by the inventors in conventional systems. For example, there is provided a processor implemented method for managing resources in Internet of Robotic Things (IoRT) environments, comprising: initializing, in a resource management system, (i) a redundancy parameter M pertaining to a plurality of resources to be deployed in an Internet of Robotic Things (IoRT) environment, and (ii) a cycle time indicative of one or more changes in the IoRT environment; obtaining, via one or more hardware processors, a list of resources from a global standby resources queue; computing, using the one or more hardware processors, reliability and availability of each resource from the list of resources based on a Mean Time Before Failure (MTBF) and a Mean Time To Repair (MTTR); generating using the one or more hardware processors, based on the reliability and availability, a priority list of resources; assigning, based on the reliability and availability, at least one unique heterogeneous subtask comprised in a homogeneous task, to one or more corresponding resources from the priority list of resources, wherein the one or more corresponding resources are being deployed in the IoRT environment, and wherein the at least one unique heterogeneous subtask comprises a subtask span indicating a completion time; determining, using the one or more hardware processors, an execution failure of the at least one unique heterogeneous subtask being performed by each of the one or more corresponding resources; upon determining the execution failure, querying, at least one specific heterogeneous subtask warm standby resource queue from a local warm standby resource queue to determine an availability status of at least one warm standby resource; and based on the availability status: (a) determining a wait time for the at least one resource that has failed to execute the at least one unique heterogeneous subtask, wherein the wait time is indicative of (i) one or more faulty resources in a local faulty standby resource queue to get repaired and added to the local warm standby resource queue, wherein each of the one or more faulty resources is a potential resource that was previously identified to perform the at least one unique heterogeneous subtask, or (ii) a next maintenance cycle, wherein during the next maintenance cycle a resource is selected and identified as a potential resource based on reliability and availability associated thereof to perform the at least one unique heterogeneous subtask by querying a global standby resource queue; or (b) identifying and selecting, based on reliability and availability, at least one warm standby resource from the at least one specific heterogeneous subtask warm standby resource queue; and (c) replacing the at least one resource that has failed to execute the at least one unique heterogeneous subtask with the identified at least one warm standby resource.

In an embodiment, the method may further comprise determining total number of resources performing the at least one unique heterogeneous subtask, wherein the total number of resources determined is less than or equal to value of the redundancy parameter M. In an embodiment, the method may further comprise varying value of the redundancy parameter M, and performing, for each varying value of the redundancy parameter M, an analysis for reliability of the IoRT environment to determine a threshold M.

In another aspect, there is provided a resource management system for managing resources in Internet of Robotic Things (IoRT) environments, comprising: a memory storing instructions and a plurality of queues; one or more communication interfaces; and one or more hardware processors coupled to the memory via the one or more communication interfaces, wherein the one or more hardware processors are configured by the instructions to: initialize, in the resource management system (i) a redundancy parameter M pertaining to a plurality of resources to be deployed in an Internet of Robotic Things (IoRT) environment, and (ii) a cycle time indicative of one or more changes in the IoRT environment; obtain a list of resources from a global standby resources queue stored in the memory; compute reliability and availability of each resource from the list of resources based on a Mean Time Before Failure (MTBF) and a Mean Time To Repair (MTTR); generate, based on the reliability and availability, a priority list of resources; assign, based on the reliability and availability, at least one unique heterogeneous subtask comprised in a homogeneous task, to one or more corresponding resources from the priority list of resources, wherein the one or more corresponding resources are being deployed in the IoRT environment, and wherein the at least one unique heterogeneous subtask comprises a subtask span indicating a completion time; determine an execution failure of the at least one unique heterogeneous subtask being performed by each of the one or more corresponding resources; upon determining the execution failure, query, at least one unique specific heterogeneous subtask warm standby resource queue from a local warm standby resource queue to determine an availability status of at least one warm standby resource; and based on the availability status: (a) determine a wait time for the at least one resource that has failed to execute the at least one unique heterogeneous subtask, wherein the wait time is indicative of (i) one or more faulty resources in a local faulty standby resource queue to get repaired and added to the local warm standby resource queue, wherein each of the one or more faulty resources is a potential resource that was previously identified to perform the at least one unique heterogeneous subtask, or (ii) a next maintenance cycle, wherein during the next maintenance cycle a resource is selected and identified as a potential resource based on reliability and availability associated thereof to perform the at least one unique heterogeneous subtask by querying a global standby resource queue; or (b) identify and selecting, based on reliability and availability, at least one warm standby resource from the at least one specific heterogeneous subtask warm standby resource queue; and (c) replace the at least one resource that has failed to execute the at least one unique heterogeneous subtask with the identified at least one warm standby resource.

In an embodiment, the one or more hardware processors are further configured by instructions to determine total number of resources performing the at least one unique heterogeneous subtask, wherein the total number of resources determined is less than or equal to value of the redundancy parameter M. In an embodiment, the one or more hardware processors are further configured by instructions to vary value of the redundancy parameter M, and perform, by using the resource management system, an analysis for reliability of the IoRT environment to determine a threshold M.

In yet another aspect, there is provided one or more non-transitory machine readable information storage mediums comprising one or more instructions which when executed by one or more hardware processors causes managing resources in Internet of Robotic Things (IoRT) environments by initializing, in a resource management system, (i) a redundancy parameter M pertaining to a plurality of resources to be deployed in an Internet of Robotic Things (IoRT) environment, and (ii) a cycle time indicative of one or more changes in the IoRT environment; obtaining, via one or more hardware processors, a list of resources from a global standby resources queue; computing, using the one or more hardware processors, reliability and availability of each resource from the list of resources based on a Mean Time Before Failure (MTBF) and a Mean Time To Repair (MTTR); generating using the one or more hardware processors, based on the reliability and availability, a priority list of resources; assigning, based on the reliability and availability, at least one unique heterogeneous subtask comprised in a homogeneous task, to one or more corresponding resources from the priority list of resources, wherein the one or more corresponding resources are being deployed in the IoRT environment, and wherein the at least one heterogeneous subtask comprises a subtask span indicating a completion time; determining, using the one or more hardware processors, an execution failure of the at least one heterogeneous subtask being performed by each of the one or more corresponding resources; upon determining the execution failure, querying, at least one specific heterogeneous subtask warm standby resource queue from a local warm standby resource queue to determine an availability status of at least one warm standby resource; and based on the availability status: (a) determining a wait time for the at least one resource that has failed to execute the at least one heterogeneous subtask, wherein the wait time is indicative of (i) one or more faulty resources in a local faulty standby resource queue to get repaired and added to the local warm standby resource queue, wherein each of the one or more faulty resources is a potential resource that was previously identified to perform the at least one heterogeneous subtask, or (ii) a next maintenance cycle, wherein during the next maintenance cycle a resource is selected and identified as a potential resource based on reliability and availability associated thereof to perform the at least one heterogeneous subtask by querying a global standby resource queue; or (b) identifying and selecting, based on reliability and availability, at least one warm standby resource from the at least one specific heterogeneous subtask warm standby resource queue; and (c) replacing the at least one resource that has failed to execute the at least one heterogeneous subtask with the identified at least one warm standby resource.

In an embodiment, the instructions which when executed by the one or more hardware processors further cause determining total number of resources performing the at least one unique heterogeneous subtask, wherein the total number of resources determined is less than or equal to value of the redundancy parameter M. In an embodiment, the instructions may further cause varying value of the redundancy parameter M, and performing an analysis for reliability of the IoRT environment to determine a threshold M.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
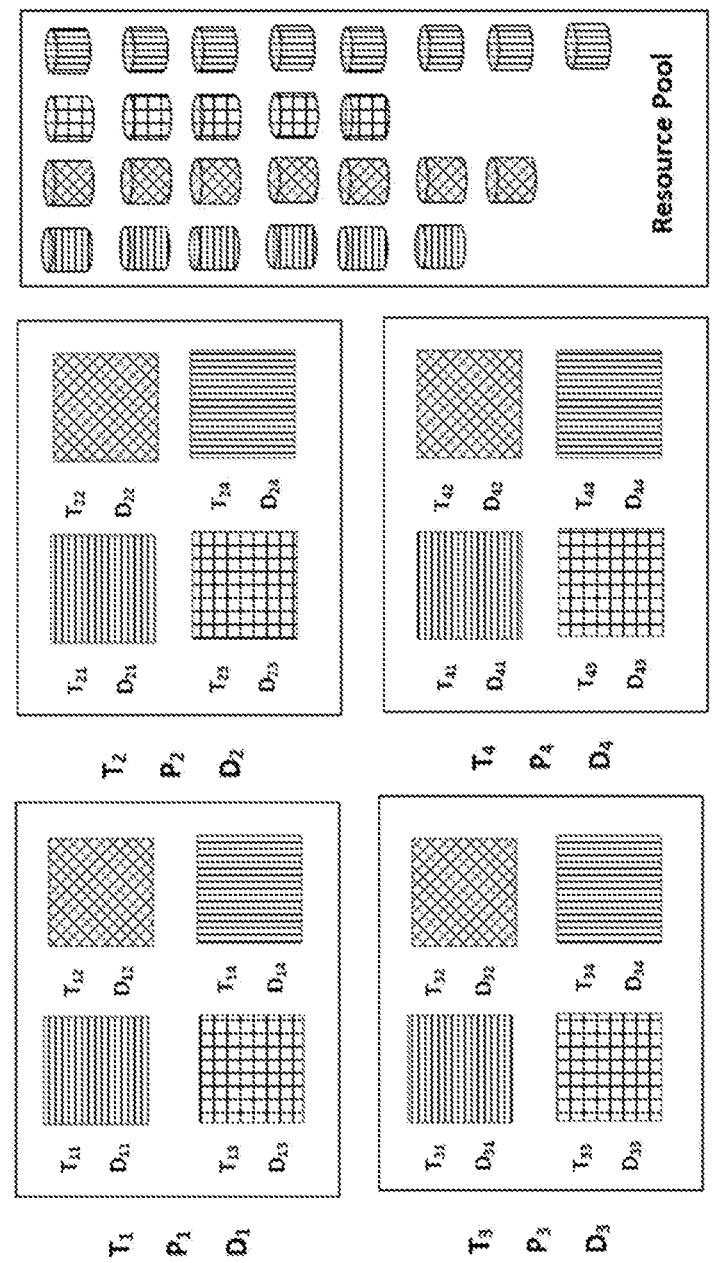
FIG. 1 illustrates a high level architecture/block diagram of a resource management system equipped with a number of heterogeneous resources configured to execute a specific type of subtask according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As discussed above, current emphasis on performing complex, collaborative tasks using multiple robots has led to the emergence of fields like Internet of Robotic Things (IoRT) and Cloud Robotics (CR). The overall aim of such systems is using lightweight and inexpensive robots along with Cloud powered distributed intelligence, to achieve complex goals. Though several compute heavy tasks are now being implemented on IoRT/CR, reliable execution of orchestrated jobs in a networked setup has been a major concern in the face of robots, compute and network failures. As resource redundancy may be the only way to achieve reliability, traditional redundancy assignment schemes may not be cost effective for tightly budgeted IoRT/CR deployments. The present disclosure proposes resources management systems and methods that implement and execute an agile redundancy model (e.g., also referred as 'At-most-M Modular Flexible Redundancy Model') for such environments with options to tune trade-off between resource cost and reliability. The proposed model provides on demand redundancy based on certain constraints on resource cost, task throughput and reliability. The model was implemented in a simulated warehouse where model robots, drones, AGVs and private cloud servers were deployed to accomplish multiple pickup and delivery tasks. The benefits of resource usage cost savings by using the proposed optimized redundancy model is illustrated and the trade-off between cost and reliability is demonstrated.

One of the examples that the present disclosure describes is a cloud robotics infrastructure deployed in an automated warehouse equipped with limited heterogeneous resources including robots, drones, automated guided vehicles (AGVs) and private cloud servers to execute various tasks that can be further subdivided into multiple subtasks. For example, in a pickup and delivery task, the subtasks can be listed as—identification, localization, picking and loading objects to an AGV such that it can be delivered to the specified destination. The proposed system of the present disclosure is configured to identify a High Availability Cluster considering the availability of individual resources and provide an optimized, on-demand redundancy mechanism such that the system can ensure a reliable service in case of any resource failure while executing the above mentioned subtasks. The present disclosure proposes an At-most M Modular Flexible Redundancy Model that not only ensures a reliable cloud robotics infrastructure but also satisfies the resource constraints by providing minimal required redundancy that varies widely between the resource types in the same system. The proposed solution is also applicable to similar reliability aware task assignment problems encountered in other distributed task execution scenario.

The proposed flexible redundancy model is compared to traditional static dual and triple redundancy models (e.g., refer 'C. Engelmann, H. Ong, and S. L. Scott, "The case for modular redundancy in large-scale high performance computing systems," in Proceedings of the IASTED International Conference, vol. 641, 2009, p. 046.') and the results clearly depict a significant improvement in system performance ensuring a tradeoff between usage cost and reliability. In the present disclosure, the systems and methods have implemented a simulated environment and replaced triple redundancy model with Atmost M redundancy model where value of M is considered to be 3. The results show approximately 15% reduction in resource usage cost.

In a cloud robotics infrastructure (e.g., refer 'G. Hu, W. P. Tay, and Y. Wen, "Cloud robotics: architecture, challenges and applications," IEEE network, vol. 26, no. 3, 2012.') the low end devices, typically robots, are equipped with limited computing capability. It is always quite challenging to determine whether to schedule the tasks among the networked robots or offload it to a high end cloud server. In task/applications involving machine vision, image processing, collaborative mapping and path planning, offloading computationally intensive tasks is preferred but it generally incurs a significant cost in terms of network latency, data transfer costs, etc. Nowadays, large organizations are adopting an alternative approach that identifies few high end devices within the system and configures them as private cloud servers. This strategy not only reduces the offloading cost but also improves the computation capability of the overall system. However, designing a fail-safe model for such a dynamic adhoc cyber physical system is a major challenge due to several factors like heterogeneous architecture, dynamic topology, autonomous nodes, etc. Therefore, it is essential to design a unique reliable redundancy model for such a system that allows the system designer to tune the trade-off between cost and reliability very easily.

Several researchers have studied the problem and proposed several reliable frameworks for simple distributed systems, wireless sensor networks, cloud infrastructures, multiprocessor systems on chip, Hadoop clusters, etc. The reliable frameworks are built under certain given constraints by implementing several fault handling strategies like redundancy, clustering, resource scheduling, task scheduling, task duplication, workload partitioning, etc. Various optimization techniques like particle swarm optimization, hybrid simulated annealing, tabu search have been deployed to achieve a tradeoff between system reliability and related overheads like energy, performance, computation, communication, etc. However, the existing work fails to provide an optimal tradeoff between system performance and costs in terms of network latency, data transfer cost, etc.

Study also reveal that modelling a reliable cloud robotics infrastructure require identification of a HAC, monitoring it regularly to identify faults due to unavoidable circumstances, selecting a suitable standby mode and configuring a suitable redundancy model that can improve the overall system performance without incurring any significant hike in deployment and maintenance cost. In the following sections the present disclosure outlines the basic concepts related to HAC, fault detection techniques and various standby mechanisms. The study depicts that the existing techniques do not suffice and certain refinements are required to model a reliable framework for a cloud robotics infrastructure.

High-Availability Cluster

To ensure a reliable cloud robotics infrastructure, tasks are required to be identified and assigned to a High-Availability Cluster (HAC) such that the ongoing service does not get disrupted in case of any resource failure and the down-time is almost negligible. Without such clustering, it is difficult to provide continual service in case of any software/hardware fault. The sole aim of deploying a HA Cluster is to ensure prompt detection of any software/hardware fault and triggering immediate recovery mechanisms without any major administrative intervention. This process is also termed as failover. In a failover process, it is essential to build up suitable redundancy in a cluster to inhibit single point failures. Therefore the challenge in a HAC lies in Fault Detection, Isolation and Recovery (FDIR). In the proposed disclosure, the systems and methods identify HAC taking into account reliability or availability of individual resources and assign tasks accordingly. The HAC is monitored regularly and suitable FDIR mechanism for hardware fault is implemented as explained in the following sections.

Fault Detection

Broadly, fault detection mechanism can be classified into two categories—proactive and reactive approach. Proactive approach is a predictive fault detection technique where a fault is identified by exploiting pattern recognition techniques. Here the recovery mechanism can be initiated before the actual fault occurs. However, this strategy requires prior knowledge of the expected behaviour of the resources that is quite unlikely in a dynamic cloud robotics environment. Understanding the behaviour pattern of all the resources in such a heterogeneous dynamic environment itself is a time consuming task that requires a deep insight to all possible events.

In Reactive Approach, the fault is detected after the actual failure. In a HAC, Heartbeat, Watchdog timer, Keepalive, etc. are usually deployed to monitor the operational status of each node and also identify any fault if any. It is observed that in this approach the risk to return ratio is low. In the present disclosure the systems and methods opt to use reactive approach of fault detection by using a Heartbeat signal to avoid the overhead of fault prediction and at the same time ensuring a negligible probability of failure to detect any fault.

Standby Modes

A standby is defined as a backup resource that is capable of replacing any faulty resource and also ensures that any ongoing service in a given system does not get disrupted due to any hardware/software fault. Standby models can be of various types and the suitable mode is selected using a tradeoff between the cost and reliability requirements. There are three variants of standby—hot, cold and warm. In hot standby mode both the primary and the secondary (backup) resource retain identical state information.

Therefore the secondary resource can take over as soon as the primary resource fails. This model when implemented in critical mission applications reduces the probability of any catastrophic loss of state information or processing capability. However, in certain applications it may not be feasible to maintain a hot standby for a mobile robot as multiple robots with the same state information necessarily mean that they are not only sharing the same logical space but also the same physical space that is absurd in real time applications.

For example, in pickup and delivery task, the robot and its standby cannot be located in the same physical co-ordinates. There should be some lag such that the standby can take over the task as soon as the robot fails. In case of cloud servers, implementation of a hot standby model is expensive as it demands constant maintenance of an identical alternative resource. Therefore, a hot standby model is not encouraged for a resource constrained cloud robotics infrastructure. In cold standby mode the backup resource takes over after the primary system fails. Here the secondary resource's state is configured only after the primary resource fails. Therefore, this model demands a significant role switching time after the initial failure. Hence, in most cases, this model fails to meet the system requirements like minimal downtime, minimal latency, maximal throughput, etc. and therefore may not be suitable for cloud robotics infrastructure that demand on schedule task completion. In warm standby mode, the secondary resource's state is configured prior to any primary resource failure and the required state information updates are scheduled at regular intervals. Therefore, this model demands a comparatively less role switching time than in cold standby model and is considered to be the most suitable standby model for a cloud robotics infrastructure that ensures a minimal latency at an optimal cost.

Redundancy Configurations

The standby models mentioned in above description can be configured broadly in 2 ways—Active/active and Active/passive. In Active/active model the work load is transferred to any other active node or equally distributed among all other functional nodes in case of any node failure. Therefore, this model may not be applicable in a heterogeneous cloud robotics infrastructure where the system is equipped with heterogeneous resources, namely, cloud servers, cloud assisted mobile robots, drones, AGVs, etc. Active/passive model is configured to overcome the limitation of homogeneity by maintaining redundant instances of all types of functional nodes. Several redundancy configurations like N+1, N+M, N-to-1, N-to-N, 2N, 3N, 3N/2, 4N/3, and so on are proposed in various literatures. However, all the existing configurations have their own limitations and therefore, cannot be implemented in a typical cloud robotics infrastructure. N+1 model maintains a single extra node that is brought online whenever any node fails. However, configuring a single node that can replace any faulty node in a heterogeneous resource cluster is impractical as it would demand a high end device, capable of all functionalities defined in all the primary nodes, that is generally not available in a resource and budget constrained infrastructure. Also, this type of model is not capable of handling multiple concurrent failures. N+M model is a variant of N+1 model and is designed for applications where single redundant instance do not suffice the requirement and the system is prone to multiple concurrent failures. M is determined by a tradeoff between the cost and reliability requirements. However, in a system offering heterogeneous services, the redundancy requirements vary from one service to another based on individual service requirements and respective resource constraints. Therefore, often the decision of determining a single constant value of M gets biased. In N-to-1 model, the standby node takes over the task from the failed node temporarily until the failed node recovers from the fault and regains its functionality. This model incurs a lot of undesirable role switching cost that can be avoided through proper planning. N-to-N is a hybrid model derived from Active/active and N+M model. Here the ongoing services are redistributed among the active nodes on the event of any node failure. This eliminates the concept of standby nodes from the system but at the same time demands extra capability of all active nodes. Other more reliable redundancy configurations that are widely used are—dual and triple modular redundancy (e.g., refer 'C. Engelmann, H. Ong, and S. L. Scott, "The case for modular redundancy in large-scale high performance computing systems," in Proceedings of the IASTED International Conference, vol. 641, 2009, p. 046.') where each active resource is backed up by one and two secondary resources respectively. However, the above mentioned configurations are mostly application specific, highly dependent on the number of resources available and require certain refinements before implementation to a cloud robotics infrastructure such that the system achieves an optimal tradeoff between cost and reliability.

From the above discussion the present disclosure can conclude that for a typical cloud robotics infrastructure that supports heterogeneous services, defining a static redundancy configuration for all services is difficult and often biased. This is because the wide variety of services is offered by a variety of resources whose reliability or availability also varies widely with varying lifetime. Also, it is not feasible to define a redundancy configuration separately for each unique service. Therefore, a tradeoff between the two is offered by the proposed systems and methods of the present disclosure which implements an At-most M Modular Flexible Redundancy Model that is a flexible variant of other static models—dual and triple (e.g., refer 'C. Engelmann, H. Ong, and S. L. Scott, "The case for modular redundancy in large-scale high performance computing systems," in Proceedings of the IASTED International Conference, vol. 641, 2009, p. 046.'). Here, instead of defining the exact degree of redundancy to be given to each service in a heterogeneous service environment, the present disclosure defines the maximum degree of redundancy that can be provided to each service in a given system. Therefore, a single handle is sufficient for the system designer to tune the tradeoff between redundancy and cost.

In the present disclosure, the systems and methods (e.g., resources management systems and methods thereof), consider an automated distribution warehouse equipped with private cloud servers, cloud assisted robots, AGVs, drones, etc. to execute multiple concurrent pickup and delivery task. The proposed At-most M-Modular Flexible Redundancy Model aims at modelling a suitable redundancy configuration that ensures reliable on-schedule execution of assigned tasks within the system given resource and time constraints without incurring any significant resource usage cost.

Given a set of homogeneous tasks where each task $T_i$ with deadline $D_{T_i}$ and priority $P_{T_i}$ is comprised of a set of heterogeneous subtasks $T_{ij}$, the present disclosure models a suitable redundancy mechanism within the given resource constraints (represented by number and type of resources available, MTBF and MTTR of resources) and budget constraints (represented by cycle time, Warm Standby-Active Handover delay, Pool-Active Handover delay, delay tolerance limit) such that it ensures reliable on schedule execution of the given tasks. Such scenarios can be often observed in a typical Industry 4.0 warehouse. For example, in a typical pickup and delivery task, the homogeneous tasks referred to here can be identifying the desired object, locating and picking it up from the pallet rack, placing it in an automated guided vehicle (AGV) such that another picker picks it from the AGV and places it in the final destination. There are several such tasks and subtasks thereof. The heterogeneous resources are the pickers, AGVs, drones etc. A pictorial representation of the same is shown in FIG. 1. The AGV might fail or the object detection algorithm/technique offloaded to a cloud server may fail and such failures need to be handled using suitable redundancy mechanisms.

Problem Statement:
Task Set (T)—The present disclosure assumes the task set T comprises of N concurrent assembly line jobs $T_i$ that are further subdivided into n sub tasks $T_{ij}$ such that $T_i = \{T_{ij} | T_{ij} \in \mathbb{Z} \text{ and } 1 \leq i \leq N \text{ and } 1 \leq j \leq n\}$ Task Priority Set $P_T$—The task priority set $P_T$ can be defined as $P_T = \{P_{T_i} | P_{T_i} \in \mathbb{Z} \text{ and } P_{T_i} \in \{0,1\}\}$ where $$P_{T_i} = \begin{cases} 1, & \text{if } T_i \text{ has a hard deadline} \\ 0, & \text{otherwise} \end{cases}$$

For example, sending products for customer shipments to containers will have a higher priority than the internal rearrangement tasks in the warehouse.

Task Deadline Set ($D_T$)—The Task Deadline Set ($D_T$) represents the deadline for each tasks. Therefore, $D_T = D_{T_i} \in \mathbb{R}$ and $D_{T_i} > 0$ and $1 \leq i \leq N$}

Subtask deadline set ($D_{ST}$)—The subtask deadline set ($D_{ST}$) represents the deadline for each subtasks. Therefore, $D_{ST} = \{D_{ST_{ij}} | D_{ST_{ij}} \in \mathbb{R} \text{ and } D_{ST_{ij}} > 0 \text{ and } 1 \leq i \leq N \text{ and } 1 \leq j \leq n\}$ Redundancy (M)—M denotes the maximum redundancy that can be provided to the given system. Therefore, at any time instance, each subtask $T_{ij}$ is provided a redundancy $m_{ij}$ such that $1 \leq m_{ij} \leq M$.

Standby configuration set (B)—The standby configuration set (B) defines the role of a resource $R_k$ at a given time instance where $$B = \begin{cases} A, & \text{if } R_k \text{ is active} \\ WS_L, & \text{if } R_k \text{ is local warm standby} \\ FS_L, & \text{if } R_k \text{ is local faulty standby} \\ S_G, & \text{if } R_k \text{ is a global standby in resource pool} \\ F_G, & \text{if } R_k \text{ is faulty and in resource pool} \end{cases}$$

Resource Set (R)—The Resource Set (R) comprises of n types of heterogeneous resources that can be robots, drones, AGVs, cloud servers, etc. and each type is designed to execute a unique subtask like object identification, localization, picking, delivering, etc. After the task execution is triggered, the Resource Set (R) gets tagged to a Standby Configuration (B) and classified as—

Active Resource Set ($R_A$)—assuming that for each subtask $T_{ij}$ a resource $R_{A_{ij}}$ is assigned to execute the given subtask. Therefore, $R_A = \{R_{A_{ij}} | R_{A_{ij}} \in R \text{ and } 1 \leq i \leq N \text{ and } 1 \leq j \leq n\}$.

Local Warm Standby Resource Set ($R_{WS_L}$)—$R_{WS_L}$ is a set of Local Warm Standby Resource Sets $$(R_{WS_{L_{ij}}})$$

where $$R_{WS_{L_{ij}}}$$

represents the warm standby resource set for jth subtask of ith task. Each resource in this set is already configured and ready to take over the corresponding task for which it is configured in case of active resource failure.

Local Faulty Standby Resource Set $(R_{FS_L})$—$R_{FS_L} = \{R_{FSL_{ij}} | 1 \le i \le N \text{ and } 1 \le j \le n\}$ where $$R_{FS_{L_{ij}}}$$

represents the set of resources that have turned faulty while executing jth subtask of ith task and under repair. The summation of the number of elements in $$R_{WS_{L_{ij}}}, R_{FS_{L_{ij}}}$$

and $R_{A_{ij}}$ for a specific value of i and j can never exceed M.

Resource Pool Set $(R_{RP})$—$R_{RP}$ is comprised of Global Standby Resource Sets $$R_{S_{G_j}}$$

and Global Faulty Resource sets $$R_{F_{G_j}} \text{ where } R_{S_{G_j}}$$

represents the resource pool set capable to execute jth subtask and presently not tagged to any specific task i and where $$R_{F_{G_j}}$$

represents the faulty resource set for subtask j and presently not tagged to any specific task i.

Resource MTBF Set $(R_{MTBF})$—$R_{MTBF}$ is a set of Mean Time before Failure for each resource. Therefore, $R_{MTBF} = \{R_{MTBF_{jk}} | R_{MTBF_{jk}} \in \mathbb{R} \text{ and } R_{MTBK_{jk}} > 0 \text{ and } 1 \le j \le n \text{ and } k \ge 1\}$ Resource MTTR Set $(R_{MTTR})$—$R_{MTTR}$ is a set of Mean Time to Repair for each resource. Therefore, $R_{MTTR} = \{R_{MTTR_{jk}} | R_{MTTR_{jk}} \in \mathbb{R} \text{ and } R_{MTTR_{jk}} > 0 \text{ and } 1 \le j \le n \text{ and } k \ge 1\}$ Cycle time ($\Delta t$)—This represents the duration of each cycle, i.e., the system is monitored after each $\Delta t$ time and the system specification are redefined.

Warm Standby-Active Handover delay ($\Delta ws$)—This represents the delay due to change in role of a resource from warm standby to active.

Pool-Active Handover delay ($\Delta p$)—This represent the delay due to change in role of a resource from resource pool to active.

Delay tolerance limit ($\delta$)—This represents the relaxation time that is provided for the completion of low priority tasks.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

Figure 2:
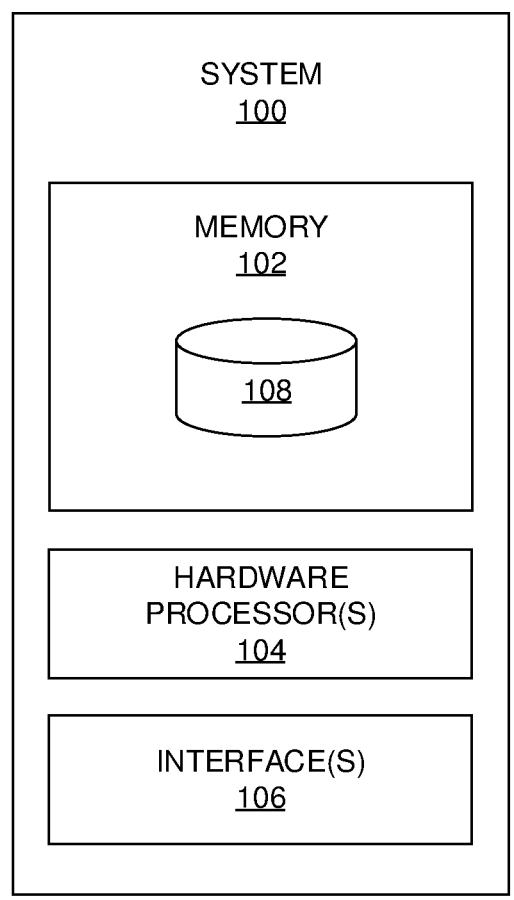
FIG. 2 illustrates an exemplary block diagram of a system for managing resources deployed in an Internet of Robotic Things (IoRT) environments in accordance with an embodiment of the present disclosure.

FIG. 2 illustrates an exemplary block diagram of a system 100 for managing resources deployed in an Internet of Robotic Things (IoRT) environments in accordance with an embodiment of the present disclosure. In an embodiment, the system 100 may also be referred as a resource management system (RMS), and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, resources management, task allocation, subtasks allocation, completion time, and the like. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 3A:
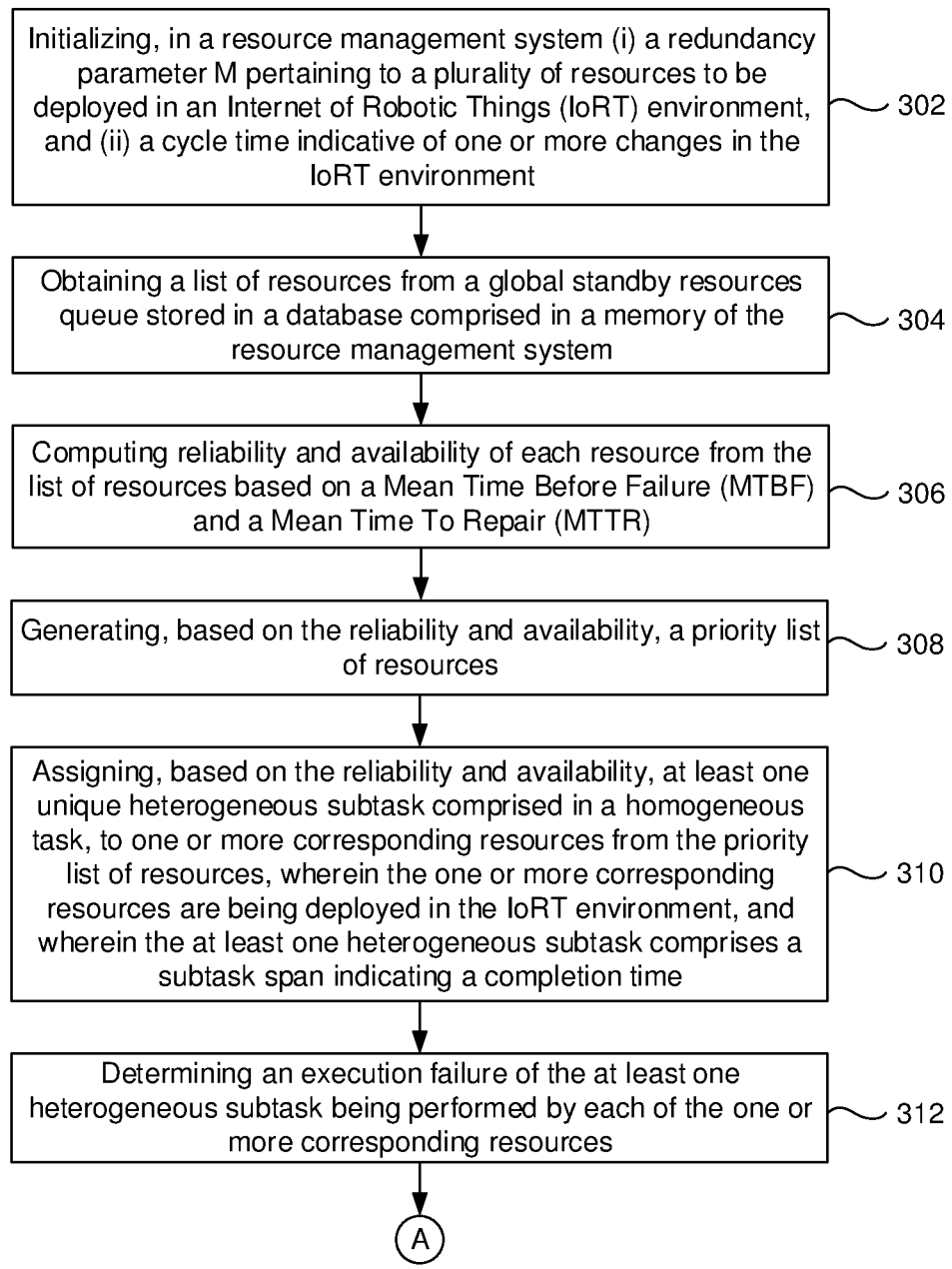
FIG. 3A and FIG. 3B illustrate an exemplary flow diagram illustrating a method for managing resources deployed in an Internet of Robotic Things (IoRT) environments using the system of FIG. 1 according to an embodiment of the present disclosure.
Figure 3B:
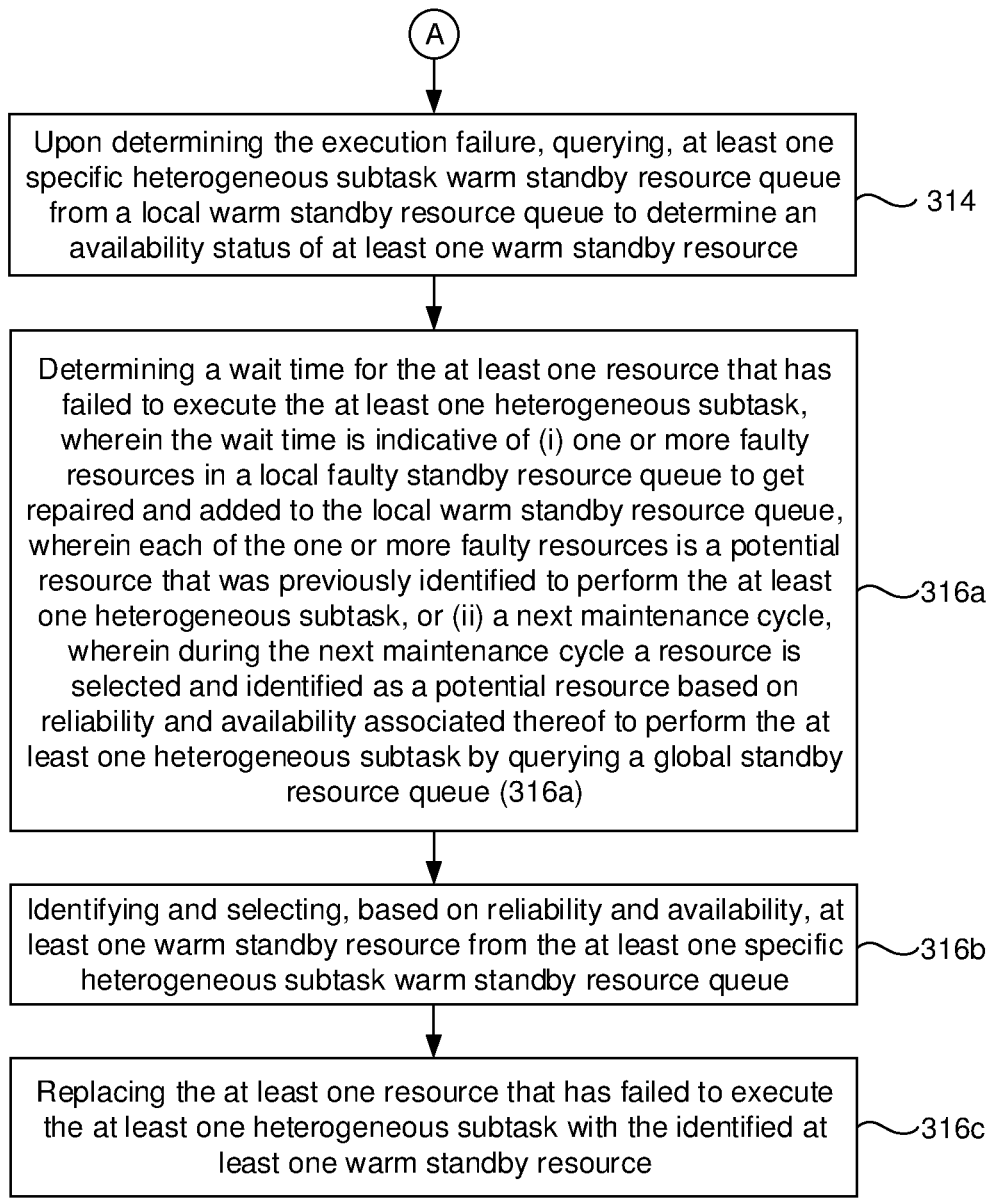

FIG. 3A and FIG. 3B, with reference to FIGS. 1-2, illustrate an exemplary flow diagram illustrating a method for managing resources deployed in an Internet of Robotic Things (IoRT) environments using the system 100 of FIG. 1 according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 2, and the flow diagram of FIGS. 3A-3B. In an embodiment of the present disclosure, at step 302, the one or more hardware processors 104 initialize, in the resource management system, (i) a redundancy parameter M pertaining to a plurality of resources to be deployed in an Internet of Robotic Things (IoRT) environment, and (ii) a cycle time $\Delta t$ indicative of one or more changes in the IoRT environment. In an embodiment of the present disclosure, at step 304, the one or more hardware processors 104 obtain a list of resources from a global standby resources queue.

In an embodiment of the present disclosure, at step 306, the one or more hardware processors 104 compute reliability and availability of each resource from the list of resources based on a Mean Time Before Failure (MTBF) and a Mean Time To Repair (MTTR). In an embodiment of the present disclosure, at step 308, the one or more hardware processors 104 generate a priority list of resources based on the reliability and availability.

In an embodiment of the present disclosure, at step 310, the one or more hardware processors 104 assign, based on the reliability and availability, at least one unique heterogeneous subtask comprised in a homogeneous task, to one or more corresponding resources from the priority list of resources, wherein the one or more corresponding resources are being deployed in the IoRT environment, and wherein the at least one heterogeneous subtask comprises a subtask span indicating a completion time. In an embodiment of the present disclosure, at step 312, the one or more hardware processors 104 determine an execution failure of the at least one heterogeneous subtask being performed by each of the one or more corresponding resources.

Upon determining the execution failure, at step 314, the one or more hardware processors 104 query, at least one specific heterogeneous subtask warm standby resource queue from a local warm standby resource queue to determine an availability status of at least one warm standby resource. In other words, a local warm standby resource queue gets queried for the at least one heterogeneous subtask failed. For instance, a particular local warm standby resource queue gets queried for that particular heterogeneous subtask wherein a particular resource has failed to accomplish.

Based on the availability status: the one or more hardware processors 104 (a) determine a wait time for the at least one resource that has failed to execute the at least one heterogeneous subtask, wherein the wait time is indicative of (i) one or more faulty resources in a local faulty standby resource queue to get repaired and added to the local warm standby resource queue, wherein each of the one or more faulty resources is a potential resource that was previously identified to perform the at least one heterogeneous subtask, or (ii) a next maintenance cycle, wherein during the next maintenance cycle a resource is selected and identified as a potential resource based on reliability and availability associated thereof to perform the at least one heterogeneous subtask by querying a global standby resource queue at step 316a, or (b) identify and select, based on reliability and availability, at least one warm standby resource from the at least one specific heterogeneous subtask warm standby resource queue at step 316b; and (c) replace the at least one resource that has failed to execute the at least one heterogeneous subtask with the identified at least one warm standby resource at step 316c. In an embodiment of the present disclosure, in case the resource management system 100 determines the availability status of at least one warm standby resource as unavailable, then the hardware processors 104 executes step 316a, else (when the availability status of at least one warm standby resource as 'available') the hardware processors 104 executes the step 316b followed by 316c.

Figure 4:
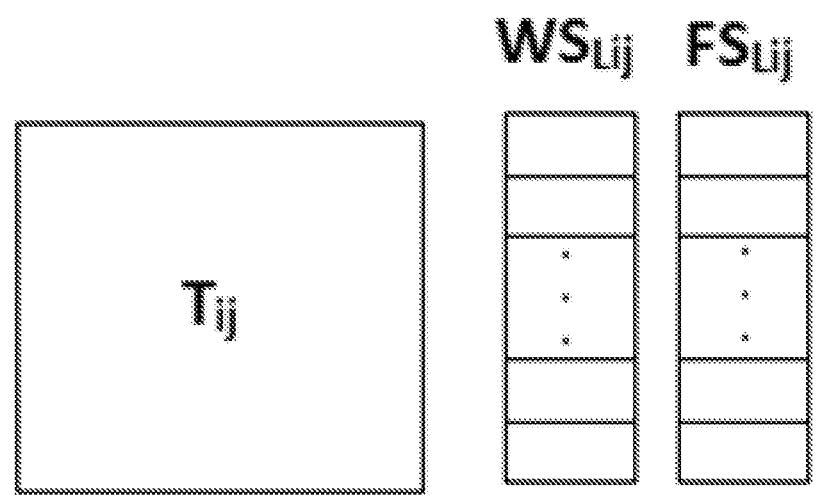
FIG. 4 depicts an exemplary Local Warm Standby Resource Queue and Local Faulty Standby Resource Queue for each subtask in accordance with an embodiment of the present disclosure.

FIG. 4, with reference to FIGS. 1 through 3, depicts an exemplary Local Warm Standby Resource Queue and Local Faulty Standby Resource Queue for each subtask $T_{ij}$ in accordance with an embodiment of the present disclosure.

Figure 5:
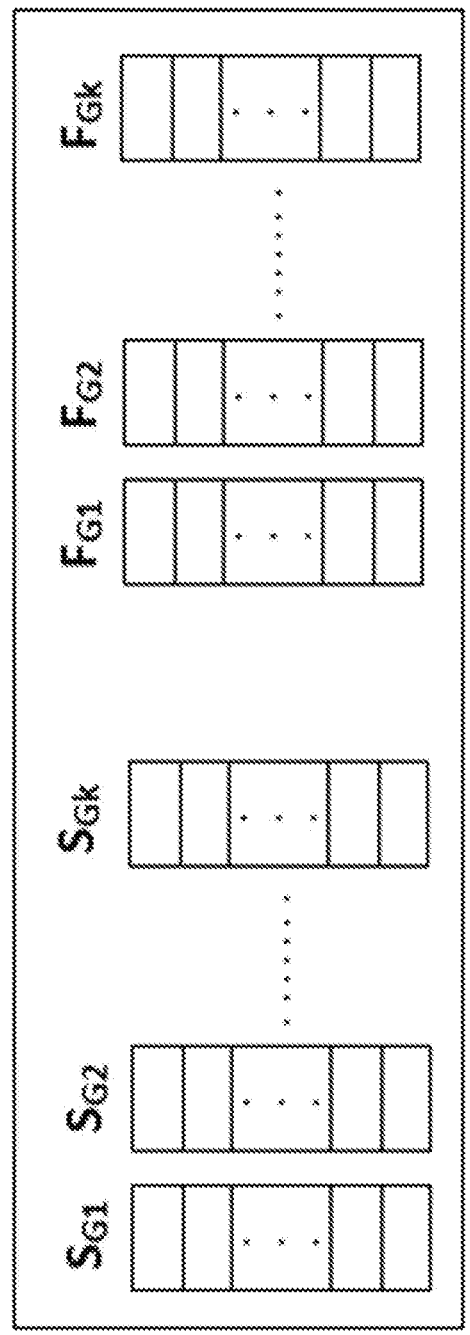
FIG. 5 depicts an exemplary Global Standby Resource Queue and Global Faulty Resource Queue in a Resource Pool in accordance with an embodiment of the present disclosure.

FIG. 5, with reference to FIGS. 1 through 4, depicts an exemplary Global Standby Resource Queue and Global Faulty Resource Queue in a Resource Pool in accordance with an embodiment of the present disclosure.

In an embodiment of the present disclosure, the one or more hardware processors 104 are further configured by the instructions to determine total number of resources performing the at least one unique heterogeneous subtask, wherein the total number of resources determined is less than or equal to value of the redundancy parameter M. In an embodiment, the one or more hardware processors 104 are further configured by the instructions to vary value of the redundancy parameter M, and perform an analysis for reliability of the IoRT environment to determine a threshold M (or threshold M'). In other words, upon determining the reliability of the system for varying values of redundancy parameter M, the resource management system employs it to determine the specific value M (M-threshold or a threshold M (or M')) which guarantees the maximum reliability for the specific system (IoRT environment) by provisioning minimum redundancy.

Below is an illustrative proposed technique of the present disclosure along with pseudo code:

Initially the system, as shown in FIG. 1, is equipped with a limited number of heterogeneous resources that can be categorized into n types where each type of resource is configured to execute a specific type of subtask. The resources are assigned to each of the available subtasks $T_{ij}$ based on task priority $P_{T_i}$, subtask span $D_{ST_{ij}}$ and the reliability and availability of the available resources such that the selected resource $R_{A_{ij}}$ ensures maximum reliability to execute the task assigned. The reliability or availability of a resource in a system can be measured using metrics like Mean Time before Failure (MTBF) and Mean Time to Repair (MTTR). Considering the failure time and repair time being represented by two sequences of random variables where the components are individually and exponentially distributed according to Equation 1 and Equation 2 respectively with means $$\frac{1}{\lambda} \text{ and } \frac{1}{\mu},$$

the reliability and availability average can be determined using exemplary Equation 3 as described below:

$$g(t) = \lambda e^{-\lambda t} \tag{1}$$

$$h(t) = \mu e^{-\mu t} \tag{2}$$

$$A_{avg} = \frac{MTBF}{MTBF + MTTR} \tag{3}$$

The above steps 202 till 220 are illustrated by way of example herein. Initially $m_{ij}$ is set to 1. The value of $m_{ij}$ is incremented on demand to a maximum value M. If any active resource $R_{A_{ij}}$ fails during execution of $T_{ij}$ before the cycle time $\Delta t$, then $R_{A_{ij}}$ is inserted to its respective local faulty standby resource set $$R_{FS_{L_{ij}}}$$

and replaced by any warm standby if available in $$R_{WS_{L_{ij}}}$$

as illustrated in below psuedo code 1. If $$R_{WS_{L_{ij}}}$$

is empty, then $T_{ij}$ has to wait either for any resource in $$R_{FS_{L_{ij}}}$$

to get repaired or for the next maintenance cycle. During the maintenance cycle if it is observed that no resource is assigned to subtask $T_{ij}$ due to unavailability of any warm standby resource in $$R_{WS_{L_{ij}}}$$

or the active resource $R_{A_{ij}}$ has turned faulty then a different faulty resource replacement strategy is adopted as elaborated in pseudo code 2. After verifying that $m_{ij} \not\geq M$, $T_{ij}$ is allocated a resource from the global standby in the resource pool set $$R_{S_{G_j}}.$$

If $$R_{S_{G_j}}$$

is empty then it has to either wait for the next maintenance cycle or for any resource in $$R_{FS_{L_{ij}}}$$

to get repaired. In the present disclosure, the systems and methods associated thereof assume the availability of a centralized Warehouse Management System that maintains these lists and runs these pseudo codes.

| Pseudo Code 1: Faulty Resource Replacement from $R_{WS}$ |
| --- |
| 1. Function Replace $(R_{A_{ij}}, R_{WS_{L_{ij}}}, R_{FS_{L_{ij}}})$ |
| 2. $R_{FS_{L_{ij}}} \leftarrow R_{FS_{L_{ij}}} \cup R_{A_{ij}}$ |
| 3. $R_{A_{ij}} \leftarrow \emptyset$ |
| 4. if $R_{WS_{L_{ij}}} \neq$ empty then |
| 5. $R_{A_{ij}} \leftarrow \text{pop}(R_{WS_{L_{ij}}})$ |
| 6. else |
| 7. wait |

| Pseudo Code 2: Faulty Resource Replacement from $R_{S_G}$ |
| --- |
| 1. Function Replace $(R_{A_{ij}}, R_{WS_{L_{ij}}}, R_{FS_{L_{ij}}}, R_{S_{G_j}}, m_{ij}, M)$ |
| 2. if $R_{A_{ij}} \neq \emptyset$ then |
| 3. $R_{FS_{L_{ij}}} \leftarrow R_{FS_{L_{ij}}} \cup R_{A_{ij}}$ |
| 4. $R_{A_{ij}} \leftarrow \emptyset$ |
| 5. if $R_{WS_{L_{ij}}} \neq$ empty then |
| 6. $R_{A_{ij}} \leftarrow \text{pop}(R_{WS_{L_{ij}}})$ |
| 7. else if $m_{ij} < M$ then |
| 8. if $R_{S_{G_j}} \neq$ empty then |
| 9. $R_{A_{ij}} \leftarrow \text{pop}(R_{S_{G_j}})$ |
| 10. $m_{ij} \leftarrow m_{ij} + 1$ |
| 11. else |
| 12. wait |
| 13. else |
| 14. wait |

In the present disclosure, the reliability of the IoRT environment is estimated by the resource management system 100 is measured using Equation 4 where $Q_{p1}$ and $Q_{po}$ represent the respective number of high priority and low priority tasks completed successfully. A task $T_i$ is said to be successfully completed only when all its respective subtasks $T_{ij}$ are completed within the defined deadline $DT_i$ (if priority $PT_i=1$) or $DT_i+\delta$ (if priority $PT_i=0$) where is the delay tolerance limit for low priority tasks and $\alpha$ and $\beta$ are tuning parameters. This enables system designer to tune the weightage given to high priority tasks and low priority tasks.

$$REL = \frac{\alpha Q_{p1} + \beta Q_{p0}}{N} \quad (4)$$

The resource usage cost incurred to complete the assigned tasks within time T can be evaluated as shown in Equation 5 where $k_A$, $k_{WS_L}$, $k_{FS_L}$, $k_{S_G}$, $k_{F_G}$ represent the cost in maintaining resources in active, warm standby, faulty standby, resource pool and faulty mode respectively. $Q_A^t$, $Q_{WS_L}^t$, $Q_{FS_L}^t$, $Q_{F_G}^t$ denote the number of resources in active, local warm standby, local faulty standby, global standby pool and global faulty mode respectively at tth time instance. In an embodiment, the system 100 can be either an integral part of the IoRT environment or connected as an external system to the IoRT environment.

Below illustrates an example of resources management proposed by the systems and methods of the present disclosure:

1. Input—
    1. Tasks—N
    2. Each task comprised of n subtasks
    3. Resources—$R=\{R_1, R_2, \ldots, R_x\}$
2. Parameter initialization
    1. Redundancy—M
    2. Redundancy Status Queue—$m=\{m_{11}, m_{12}, \ldots, m_{ij}, \ldots, m_{N_n}\}$ where $m_{ij}$ represents current redundancy given to ith subtask of jth task
    3. Cycle time—t
    4. Active Resource Queue—$A=\{A_{11}, A_{12}, \ldots, A_{ij}, \ldots, A_{N_n}\}$ where $A_{ij}$ represents active resource identifier (ID) for jth subtask of ith task
    5. Local Warm Standby Resource Queue—$WS_L=\{WS_{L11}, WS_{L12}, \ldots, WS_{Lij}, \ldots, WS_{LN_n}\}$ where $WS_{Lij}$ represents Local Warm Standby Resource Queue for jth subtask of ith task
    6. Local Faulty Standby Resource Queue $FS_L=\{FS_{L11}, FS_{12}, \ldots, FS_{Lij}, \ldots, FS_{LN_n}\}$ where $FS_{Lij}$ represents Faulty Standby Resource Queue for jth subtask of ith task
    7. Resource Pool
        1. Global Standby Resource Queue—$S_G=\{S_{G1}, S_{G2}, \ldots, S_{Gk}, \ldots, S_{Gn}\}$ where $S_{Gk}$ represents Global Standby Resource Queue for kth subtask
        2. Global Faulty Resource Queue—$F_G=\{F_{G1}, F_{G2}, \ldots, F_{Gk}, \ldots, F_{Gn}\}$ where $F_{Gk}$ represents Global Faulty Resource Queue for kth subtask Example—
N=4
n=4
$R=\{R_1, R_2, \ldots, R_{50}\}$
M=3
Initially all other queues are empty.
The resources are sorted based on the heterogeneous subtask they are capable of executing and each individual queue is sorted based on availability of each resources (e.g., say descending order)

$$S_{G1}=\{R_1, R_2, \ldots, R_{12}\}$$

$$S_{G2}=\{R_{13}, R_{14}, \ldots, R_{25}\}$$

$$S_{G3}=\{R_{26}, R_{27}, \ldots, R_{37}\}$$

$$S_{G4}=\{R_{38}, R_{39}, \ldots, R_{50}\}$$

Now based on task priority, subtask span and availability of resources, a resource is allocated to each subtask $$A=\{R_1, R_{13}, R_{26}, R_{38}, R_{12}, R_{14}, R_{27}, R_{39}, R_3, R_{15}, R_{28}, R_{40}, R_4, R_{16}, R_{29}, R_{41}\}$$

$$m=\{1,1,1,1,1,1,1,1,1,1,1,1,1,1,1,1\}$$

$$S_{G1}=S_{G1}-\{R_1, R_2, R_3, R_4\}$$

$$S_{G2}=S_{G2}-\{R_{13}, R_{14}, R_{15}, R_{16}\}$$

$$S_{G3}=S_{G3}-\{R_{26}, R_{27}, R_{28}, R_{29}\}$$

$$S_{G4}=S_{G4}-\{R_{38}, R_{39}, R_{40}, R_{41}\}$$

After some time (before the next maintenance cycle) assuming that say $R_1$, $R_{14}$, $R_{16}$, and $R_{38}$ get faulty, therefore:

$$A=\{\emptyset, R_{13}, R_{26}, \emptyset, R_{12}, \emptyset, R_{27}, R_{39}, R_3, R_{15}, R_{28}, R_{40}, R_4, \emptyset, R_{29}, R_{41}\}$$

and $$FS_{L11}=\{R_1\}, FS_{L22}=\{R_{14}\}, FS_{L42}=\{R_{16}\}, \text{ and } FS_{L14}=\{R_{38}\}.$$

Search for any warm standby in $WS_{L11}$, $WS_{L22}$, $WS_{L14}$ is carried out by the system 100, but it does not find any local warm standby and has to wait for their corresponding faulty standby resources in their corresponding faulty standby resource queues ($FS_{L11}$, $FS_{L22}$, $FS_{L42}$, and $FS_{L14}$) to get repaired or for next maintenance cycle whichever is earlier.

Considering that t<repair time of $R_1$, $R_{14}$, $R_{16}$, and $R_{38}$, in the next maintenance cycle, $$m=\{2,1,1,2,1,2,1,1,1,1,1,1,1,2,1,1\}$$

$$A=\{R_5, R_{13}, R_{26}, R_{42}, R_{12}, R_{14}, R_{27}, R_{39}, R_3, R_{15}, R_{28}, R_{40}, R_4, R_{18}, R_{29}, R_{41}\}$$

$$S_{G1}=S_{G1}-\{R_5\}$$

$$S_{G2}=S_{G2}-\{R_{17}, R_{18}\}$$

$$S_{G4}=S_{G4}-\{R_{42}\}$$

After some time $R_1$, $R_{14}$, $R_{16}$, and $R_{38}$ get repaired, therefore:

$$WS_{L11}=\{R_1\}, WS_{L22}=\{R_{14}\}, WS_{L42}=\{R_{16}\}, \text{ and } WS_{L14}=\{R_{38}\} \text{ and } FS_{L11}=\{\emptyset\}, FS_{L22}=\{\emptyset\}, FS_{L42}=\{\emptyset\}, \text{ and } FS_{L14}=\{\emptyset\}$$

After some time say $R_5$ gets faulty. Therefore, A will be now as expressed below:

$$A=\{R_1, R_{17}, R_{26}, R_{42}, R_{12}, R_{14}, R_{27}, R_{39}, R_3, R_{15}, R_{28}, R_{40}, R_4, R_{18}, R_{29}, R_{41}\}, \text{ and}$$

$$WS_{L11}=\{\emptyset\}, \text{ and } FS_{L11}=\{R_5\}.$$

After some time say $R_1$ again turns faulty. Therefore, A will be now as expressed below:

$$A=\{\emptyset, R_{17}, R_{26}, R_{42}, R_{12}, R_{14}, R_{27}, R_{39}, R_3, R_{15}, R_{28}, R_{40}, R_4, R_{18}, R_{29}, R_{41}\}, \text{ and}$$

$$WS_{L11}=\{\emptyset\}, \text{ and } FS_{L11}=\{R_5, R_1\}.$$

Before $R_5$ or $R_1$ gets repaired, the next maintenance cycle starts. Therefore, changes in the system get updated and expressed as below:

$$m=\{3,1,1,2,1,2,1,1,1,1,1,1,1,2,1,1\}$$

$$A=\{R_6, R_{17}, R_{26}, R_{42}, R_2, R_{14}, R_{27}, R_{39}, R_3, R_{15}, R_{28}, R_{40}, R_4, R_{18}, R_{29}, R_{41}\}$$

$$S_{G1}=S_{G1}\{R_6\}$$

After some time (before next maintenance cycle) say $R_6$ fails. Now, $$A=\{\emptyset, R_{17}, R_{26}, R_{42}, R_2, R_{14}, R_{27}, R_{39}, R_3, R_{15}, R_{28}, R_{40}, R_4, R_{18}, R_{29}, R_{41}\}$$

$$WS_{L11}=\{\emptyset\}, \text{ and } FS_{L11}=\{R_5, R_1, R_6\}.$$

Therefore, before the next maintenance cycle neither $R_5$, $R_1$, $R_6$ gets repaired. Now, during the maintenance cycle, $m_{11}=M=3$. So it cannot be incremented further. Therefore, one faulty resource from $FS_{L11}$ is removed and added to $F_{G1}$ and one standby from $S_{G1}$ is selected to execute $1^{st}$ subtask of $1^{st}$ task.

$F_{G1} = \{R_5\}$ $S_{G1} = S_{G1} - \{R_7\}$ $A = \{R_7, R_{17}, R_{26}, R_{42}, R_2, R_{14}, R_{27}, R_{39}, R_3, R_{15}, R_{28}, R_{40}, R_4, R_{18}, R_{29}, R_{41}\}$ $WS_{L11} = \{\emptyset\}$, and $FS_{L11} = \{R_1, R_6\}$ In this way the process continues and changes are updated in the system 100 in the respective resource queues that are stored in the database 108 of the memory 102.

Figure 6:
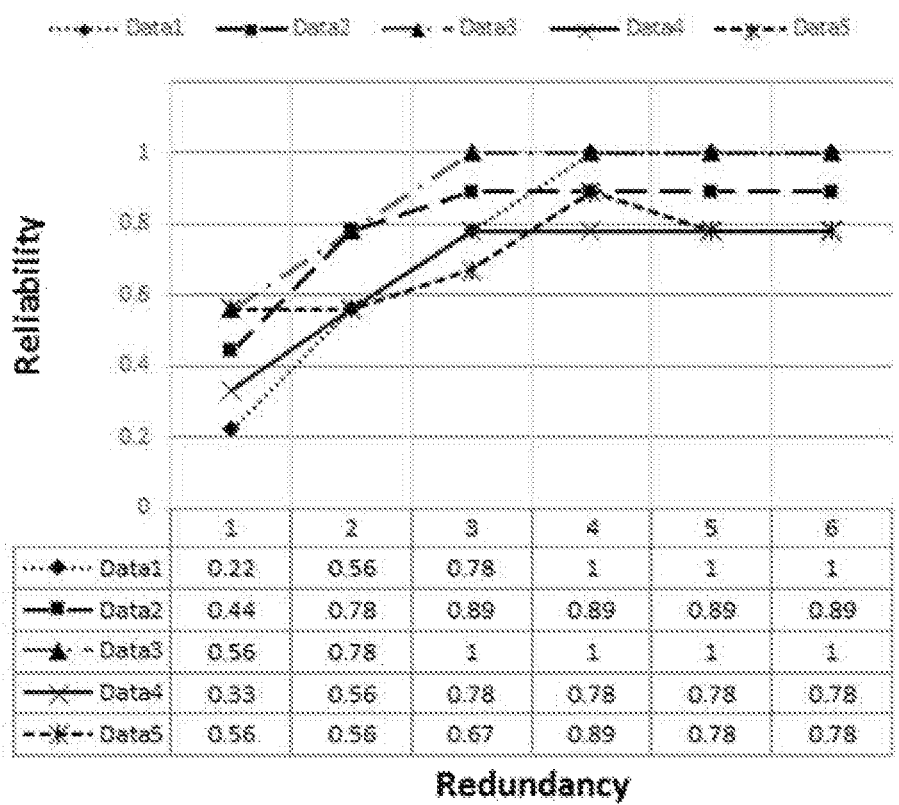
FIG. 6 illustrates a graphical representation depicting Reliability Analysis on varying value of M in At-most M-Modular Flexible Redundancy Model in accordance with an embodiment of the present disclosure.

Experimental Results:

The present disclosure implemented the proposed systems and methods and experiment was performed to reach a consensus about the value of M in the proposed At-most M Flexible Redundancy Model. 5 test scenarios were simulated and tested using different values of M. FIG. 6, with reference to FIGS. 1 through 5, illustrates a graphical representation depicting Reliability Analysis on varying value of M in At-most M-Modular Flexible Redundancy Model in accordance with an embodiment of the present disclosure. It was observed that generally the reliability of the system increases as value of M is gradually increased. However, it reaches a threshold (M-threshold) and after that the reliability becomes constant. However, in FIG. 6 it is observed that in few instances the reliability varies. This may depend on several factors such as for example, the ratio among the number of resources available for each subtask, task span, frequency of maintenance cycle, resource's MTBF and MTTR, etc.

As discussed above, traditional redundancy assignment schemes are not cost effective for budget constrained CR/IoRT deployments, where robots are primarily used for achieving high task throughput at reduced cost. Static assignment of redundant resources lead to exponential increase in cost. Thus effective scheduling of the limited available redundant resources and providing a suitable framework to the system designer to tune the trade-off between redundancy and cost is essential. Embodiments of the present disclosure provide resource management systems and methods thereof for reliable on-schedule execution of assigned tasks in a cloud robotics (CR) system while satisfying the given resource and time constraints without incurring any significant resource usage cost. The systems provide adequate redundancy in terms of resources to the system.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

initializing, in a resource management system, (i) a redundancy parameter M pertaining to a plurality of resources to be deployed in an Internet of Robotic Things (IoRT) environment, and (ii) a cycle time indicative of one or more changes in the IoRT environment, wherein the plurality of resources includes robots, drones, automated guided vehicles (AGVs) and private cloud servers, and wherein the plurality of resources are configured to perform collaborative tasks;

obtaining, via one or more hardware processors, a list of resources from a global standby resources queue;

computing, using the one or more hardware processors, reliability and availability of each resource from the list of resources based on a Mean Time Before Failure (MTBF) and a Mean Time To Repair (MTTR);

generating using the one or more hardware processors, based on the reliability and availability, a priority list of resources;

assigning, based on the reliability and availability, at least one unique heterogeneous subtask comprised in a homogeneous task, to one or more corresponding resources from the priority list of resources, wherein the one or more corresponding resources are being deployed in the IoRT environment, and wherein the at least one heterogeneous subtask comprises a subtask span indicating a completion time;

determining, using the one or more hardware processors, an execution failure of the at least one unique heterogeneous subtask being performed by each of the one or more corresponding resources;

upon determining the execution failure, querying, at least one specific heterogeneous subtask warm standby resource queue from a local warm standby resource queue to determine an availability status of at least one warm standby resource; and based on the availability status:

(a) determining a wait time for the at least one resource that has failed to execute the at least one unique heterogeneous subtask, wherein the wait time is indicative of (i) one or more faulty resources in a local faulty standby resource queue to get repaired and added to the local warm standby resource queue, wherein each of the one or more faulty resources is a potential resource that was previously identified to perform the at least one heterogeneous subtask, or (ii) a next maintenance cycle, wherein during the next maintenance cycle a resource is selected and identified as a potential resource based on reliability and availability associated thereof to perform the at least one unique heterogeneous subtask by querying a global standby resource queue; or (b) identifying and selecting, based on reliability and availability, at least one warm standby resource from the at least one specific heterogeneous subtask warm standby resource queue; and (c) replacing the at least one resource that has failed to execute the at least one unique heterogeneous subtask with the identified at least one warm standby resource.

2. The processor implemented method of claim 1, further comprising determining total number of resources performing the at least one unique heterogeneous subtask, wherein the total number of resources determined is less than or equal to value of the redundancy parameter M.

3. The processor implemented method of claim 2, further comprising varying the value of the redundancy parameter M; and performing, for each varying value of the redundancy parameter M, an analysis for reliability of the IoRT environment to determine a threshold M.

4. A resource management system, comprising:

a memory storing instructions;

one or more communication interfaces; and one or more hardware processors coupled to the memory via the one or more communication interfaces, wherein the one or more hardware processors are configured by the instructions to:

initialize, in the resource management system (i) a redundancy parameter M pertaining to a plurality of resources to be deployed in an Internet of Robotic Things (IoRT) environment, and (ii) a cycle time indicative of one or more changes in the IoRT environment, wherein the plurality of resources includes robots, drones, automated guided vehicles (AGVs) and private cloud servers, and wherein the plurality of resources are configured to perform collaborative tasks;

obtain a list of resources from a global standby resources queue stored in the memory;

compute reliability and availability of each resource from the list of resources based on a Mean Time Before Failure (MTBF) and a Mean Time To Repair (MTTR); generate, based on the reliability and availability, a priority list of resources;

assign, based on the reliability and availability, at least one unique heterogeneous subtask comprised in a homogeneous task, to one or more corresponding resources from the priority list of resources, wherein the one or more corresponding resources are being deployed in the IoRT environment, and wherein the at least one heterogeneous subtask comprises a subtask span indicating a completion time;

determine an execution failure of the at least one unique heterogeneous subtask being performed by each of the one or more corresponding resources;

upon determining the execution failure, query, at least one specific heterogeneous subtask warm standby resource queue from a local warm standby resource queue to determine an availability status of at least one warm standby resource; and based on the availability status:

(a) determine a wait time for the at least one resource that has failed to execute the at least one unique heterogeneous subtask, wherein the wait time is indicative of (i) one or more faulty resources in a local faulty standby resource queue to get repaired and added to the local warm standby resource queue, wherein each of the one or more faulty resources is a potential resource that was previously identified to perform the at least one unique heterogeneous subtask, or (ii) a next maintenance cycle, wherein during the next maintenance cycle a resource is selected and identified as a potential resource based on reliability and availability associated thereof to perform the at least one unique heterogeneous subtask by querying a global standby resource queue; or (b) identify and selecting, based on reliability and availability, at least one warm standby resource from the at least one specific heterogeneous subtask warm standby resource queue; and (c) replace the at least one resource that has failed to execute the at least one unique heterogeneous subtask with the identified at least one warm standby resource.

5. The system of claim 4, wherein the one or more hardware processors are further configured by the instructions to determine total number of resources performing the at least one unique heterogeneous subtask, wherein the total number of resources determined is less than or equal to value of the redundancy parameter M.

6. The system of claim 5, wherein the one or more hardware processors are further configured by the instructions to vary value of the redundancy parameter M; and perform, for each varying value of the redundancy parameter M, an analysis for reliability of the IoRT environment to determine a threshold M.

7. One or more non-transitory machine readable information storage mediums comprising one or more instructions which when executed by one or more hardware processors cause:

initializing, in a resource management system, (i) a redundancy parameter M pertaining to a plurality of resources to be deployed in an Internet of Robotic Things (IoRT) environment, and (ii) a cycle time indicative of one or more changes in the IoRT environment, wherein the plurality of resources includes robots, drones, automated guided vehicles (AGVs) and private cloud servers, and wherein the plurality of resources are configured to perform collaborative tasks;

obtaining, via the one or more hardware processors, a list of resources from a global standby resources queue;

computing, using the one or more hardware processors, reliability and availability of each resource from the list of resources based on a Mean Time Before Failure (MTBF) and a Mean Time To Repair (MTTR);

generating using the one or more hardware processors, based on the reliability and availability, a priority list of resources;

assigning, based on the reliability and availability, at least one unique heterogeneous subtask comprised in a homogeneous task, to one or more corresponding resources from the priority list of resources, wherein the one or more corresponding resources are being deployed in the IoRT environment, and wherein the at least one heterogeneous subtask comprises a subtask span indicating a completion time;

determining, using the one or more hardware processors, an execution failure of the at least one unique heterogeneous subtask being performed by each of the one or more corresponding resources;

upon determining the execution failure, querying, at least one specific heterogeneous subtask warm standby resource queue from a local warm standby resource queue to determine an availability status of at least one warm standby resource; and based on the availability status:

(a) determining a wait time for the at least one resource that has failed to execute the at least one unique heterogeneous subtask, wherein the wait time is indicative of (i) one or more faulty resources in a local faulty standby resource queue to get repaired and added to the local warm standby resource queue, wherein each of the one or more faulty resources is a potential resource that was previously identified to perform the at least one heterogeneous subtask, or (ii) a next maintenance cycle, wherein during the next maintenance cycle a resource is selected and identified as a potential resource based on reliability and availability associated thereof to perform the at least one unique heterogeneous subtask by querying a global standby resource queue; or (b) identifying and selecting, based on reliability and availability, at least one warm standby resource from the at least one specific heterogeneous subtask warm standby resource queue; and (c) replacing the at least one resource that has failed to execute the at least one unique heterogeneous subtask with the identified at least one warm standby resource.

8. The one or more non-transitory machine readable information storage mediums of claim 7, wherein the instructions which when executed by the one or more hardware processors further cause determining total number of resources performing the at least one unique heterogeneous subtask, and wherein the total number of resources determined is less than or equal to value of the redundancy parameter M.

9. The one or more non-transitory machine readable information storage mediums of claim 8, wherein the instructions which when executed by the one or more hardware processors further cause varying the value of the redundancy parameter M; and performing, for each varying value of the redundancy parameter M, an analysis for reliability of the IoRT environment to determine a threshold M.

* * * * *